United States Patent Office 3,190,861
Patented June 22, 1965

3,190,861
AZOBENZENE CONTAINING POLYMERIC COMPOSITIONS CAPABLE OF BEING INTEGRALLY COLORED AND WHICH ARE RESISTANT TO ULTRA-VIOLET LIGHT
Joseph Fertig, New York, N.Y., Albert I. Goldberg, Berkeley Heights, N.J., and Martin Skoultchi, New York, N.Y., assignors to National Starch and Chemical Corporation, New York, N.Y., a corporation of Delaware
No Drawing. Filed June 26, 1962, Ser. No. 205,218
1 Claim. (Cl. 260—86.1)

This invention relates to polymeric compositions and the process for their preparation. More particularly, this invention relates to copolymers which may display a uniform coloration comprising any shading of primary colors and which also possess resistance to the degradative effects of ultra-violet radiation.

It is the object of this invention to prepare polymeric compositions which can display any desired shading of primary colors and which also possess improved light stability. Another object of this invention involves the preparation of polymeric compositions which are permanently and uniformly colored without the need for any special post polymerization treatment or for any formulation with extraneous dyes or pigments. A further object of this invention involves the preparation of polymers which withstand the effects of ultra-violet light without the necessity of their being formulated with any extraneous ultra-violet light absorbers. Various other objects and advantages of this invention will become apparent from the following description.

Present methods for coloring polymers involve their formulation with either oil soluble dyes or with solid, inert pigments which are dispersed in the polymer. These methods present few difficulties when applied to low melting plastics such, for example, as polyethylene. However, these extraneous additives are quite often inoperable when attempts are made to color high melting, crystalline polymers, such as polypropylene or polyacrylonitrile, which are, of course, the type of polymer which is ordinarily utilized for the preparation of synthetic fibers. Thus, in order to render such polymers dyeable, it has been necessary to have them chemically and/or physically modified, subsequent to their polymerization, whereupon a very specific dye would then have to be used to color each different polymer type.

The incorporation of ultra-violet light absorbers in the synthetic plastics derived from high polymers is, of course, a practice well known to those skilled in the art. Such ultra-violet absorbers are required since outdoor exposure to natural sunlight or continuous indoor exposure to fluorescent light tends to degrade most plastics and this photodegradation of plastics is, in turn, known to be caused by the ultra-violet portion of light. Such degradation is observable in a plastic as a result of a change in color, such as a yellowing or darkening, and/or by a deterioration of its physical properties, such as its flexural strength and elongation.

In our copending applications, Serial No. 188,862 and Serial No. 188,861, both filed April 19, 1962, and assigned to the assignee of the present application, there are disclosed two novel classes of vinyl type monomers comprising, respectively, the beta-hydroxypropyl acrylate and methacrylate ethers and esters of azobenzene. We have now discovered that a wide variety of copolymers which are derived from these novel monomers are found to be effectively stabilized against ultra-violet radiation without requiring the addition to said polymers of any extraneous ultra-violet absorbers. The novel polymeric compositions of our invention are thus found to possess all of the many advantages, and particularly the improved light stability, which results from the utilization of extraneous ultra-violet light absorbers while managing to avoid all of the problems which are normally associated with their use.

We have also discovered that the use of these novel monomers in higher concentrations results in the preparation of copolymers which, in addition to their enhanced light stability, also possess an unextractable "built in" color. Moreover, by selecting the proper azobenzene monomer, it is possible to prepare these copolymers so that they may inherently possess any desired shading of primary colors which may be chosen by the practitioner without the need for any special treatment of the polymer or a blending of the latter with extraneous dyes or pigments.

This integral color, as well as the above described light stability, are imparted to these copolymers as a result of the presence therein of the azobenzene moiety which is permanently bound into and inherently part of the resulting copolymer molecules as a result of the incorporation therein of these ethylenically unsaturated acryloxy or methacryloxy azobenzene derivatives.

The products of our inventioin may thus be said to comprise those copolymers containing at least one ethylenically unsaturated beta-hydroxypropyl acrylate or methacrylate ether or ester of azobenzene corresponding to the formula:

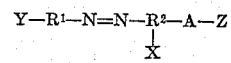

wherein $R^1$ and $R^2$ are radicals of the benzene series selected from among the group consisting of phenyl and naphthyl radicals, and wherein Z is an ethylenically unsaturated group selected from the class consisting of beta-hydroxypropyl acrylate and beta-hydroxypropyl methacrylate groups, and X and Y represent at least one member of the group consisting of hydrogen, alkyl, aryl, acyloxy, aralkyl, alkoxy, hydroxy, and halogen radicals, and A represents a radical selected from among the group consisting of oxygen, i.e. —O—, and carboxy, i.e.

radicals.

The following list is representative of the above described monomers containing the azobenzene moiety which are applicable for use as comonomers for preparing the copolymers of our invention. For purposes of brevity, this list notes only the beta-hydroxypropyl methacrylate ethers and esters of azobenzene; however, it is, of course, to be understood that the corresponding beta-hydroxypropyl acrylate ethers and esters can also be utilized.

GROUP I.—BETA-HYDROXYPROPYL METHACRYLATE ETHERS OF AZOBENZENE 2-hydroxy-3-(4-[4-methylphenylazo]phenoxy)propyl-methacrylate;
2-hydroxy-3-(4-phenylazophenoxy)propyl methacrylate;
2-hydroxy-3-(4-[2-chlorophenylazo]phenoxy)propyl methacrylate;
2-hydroxy-3-(4-[2-methoxyphenylazo]phenoxy)propyl methacrylate;
2-hydroxy-3-(1-phenylazo-2-naphthyloxy)propyl methacrylate;
2-hydroxy-3-(4-phenylazo-1-naphthyloxy)propyl methacrylate;
2-hydroxy-3-(4-[4-carboxymethylphenylazo]phenoxy) propyl methacrylate;
2-hydroxy-3-(4-[3-methylphenylazo]phenoxy)propyl methacrylate;
2-hydroxy-3-(4-[2-methylphenylazo]phenoxy)propyl methacrylate;
2-hydroxy-3-(4-[3-chlorophenylazo]phenoxy)propyl methacrylate;
2-hydroxy-3-(4-[4-chlorophenylazo]phenoxy)propyl methacrylate;
2-hydroxy-3-(4-[3-methoxyphenylazo]phenoxy)propyl methacrylate;
2-hydroxy-3-(4-[4-methoxyphenylazo]phenoxy)propyl methacrylate; and,
2-hydroxy-3-(2-phenyl-4-phenylazophenoxy)propyl methacrylate.

GROUP II.—BETA-HYDROXYPROPYL METHACRYLATE ESTERS OF AZOBENZENE 2-hydroxy-3-(5-phenylazo-2-hydroxybenzoyloxy)propyl methacrylate;
2-hydroxy-3-(4-phenylazobenzoyloxy)propyl methacrylate;
2-hydroxy-3-(2-phenylazobenzoyloxy)propyl methacrylate;
2-hydroxy-3-(4-[4-methylphenylazo]benzolyloxy)propyl methacrylate;
2-hydroxy-3-(5-[4-methylphenylazo]-2-hydroxybenzoyloxy)propyl methacrylate;
2-hydroxy-3-(5-[3-methylphenylazo]-2-hydroxybenzoyloxy)propyl methacrylate;
2-hydroxy-3-(5-[2-methylphenylazo]-2-hydroxybenzoyloxy)propyl methacrylate;
2-hydroxy-3-(4-[2-chlorophenylazo]benzoyloxy)propyl methacrylate;
2-hydroxy-3-(4-[2-methoxyphenylazo]benzoyloxy)propyl methacrylate;
2-hydroxy-3-(4-[4-phenylphenylazo]benzoyloxy)propyl methacrylate; and,
2-hydroxy-3-(4-[2-naphthylazo]benzoyloxy)propyl methacrylate.

Thus it is to be seen that the monomers which are essential for the preparation of the polymeric compositions of our invention may be described as the beta-hydroxypropyl acrylate and methacrylate ethers and esters of azobenzene. Each of the above listed monomeric derivatives may, in turn, contain a variety of other substituent groups including halogen, alkyl, aryl, acyloxy, aralkyl, alkoxy and hydroxy groups wherein any one, or more of these latter substituent groups may be substituted on any available position on either one or both of the phenyl rings in the azobenzene nucleus. As noted in the above described copending applications, it is the presence of these various substituent groups on the different available positions of the azobenzene nucleus which provides these monomers with their wide range of inherent colors. Thus, the practitioner need only select the properly substituted azobenzene monomer, i.e., the monomer having the desired color, in order to prepare a copolymer which will, in turn, have the same coloration, this coloration being, in fact, more or less intense depending upon the concentration of the azobenzene comonomer in the resulting copolymer. Our copolymers may, therefore, be prepared so as to possess any desired shading of primary color.

The comonomers which may be utilized together with the above described ethylenically unsaturated azobenzene derivatives for the preparation of the ultra-violet stable integrally colored compositions of our invention can be any ethylenically unsaturated monomer such, for example, as styrene; methyl styrene; the acrylic and methacrylic acid esters of aliphatic alcohols such as methyl, ethyl, propyl, butyl, isobutyl, hexyl, 2-ethyl hexyl, octyl, lauryl and stearyl alcohols; acrylic acid; methacrylic acid; acrylamide; acrylonitrile; methacrylonitrile; vinylidene chloride; vinyl chloride; vinyl acetate; ethylene; and propylene, etc. Any of these monomers may be used either alone or in combination with one another together with one or more of the azobenzene containing monomers.

In order to effectively withstand the effects of ultraviolet radiation, the copolymers of our invention should contain at least 0.005%, by weight, of these ethylenically unsaturated azobenzene derivatives. As for the maximum concentration, this will of course depend upon the particular comonomer as well as on the specific end use application of the resulting copolymer. However, in most cases a concentration of about 0.1%, by weight, will be fully adequate with optimum results being obtained with a concentration in the range of about 0.05%.

With respect to the use of these azobenzene derivatives as dye monomers, we have found that a gradual appearance of color is evident when the latter are present at concentrations over about 0.05%, by weight, of the resulting copolymer. This coloration becomes more pronounced at a concentration of approximately 0.10% and at about 0.2% a faintly colored polymer is produced; the latter being, in fact, recommended as the minimum concentration suitable for use in the preparation of colored polymers. The maximum concentration utilized will, of course, depend upon the degree of coloration which is desired. However, maximum coloration is ordinarily obtained by the use of no more than about 10%, by weight, of dye monomer.

From the above discussion, it will be obvious that all of the copolymers of our invention will possess improved light stability whereas the presence of "built in" coloration will ordinarily be found only in those copolymers wherein the concentration of the azobenzene derivative is at a level of about 0.1%, or higher.

As for the actual preparation of the copolymers of our invention, there may be employed any of the usual vinyl polymerization methods which are well known to those skilled in the art. Thus, they may be prepared by means of free radical initiated processes utilizing bulk, suspension, solution, or emulsion polymerization techniques; or, they may be prepared by ionic catalysis or by means of stereo-specific catalysts such as those of the type developed by Ziegler.

In any event, the homo- and copolymers of our invention, whether prepared by means of bulk, suspension, solution, or emulsion polymerization technique or by other means, are all characterized by their improved stability to light.

Moreover, when prepared so as to contain a concentration of the azobenzene monomer sufficient to impart noticeable coloration, the products of our invention provide the practitioner with copolymers which obviate the use of the extraneous dyes or pigments as well as the chemical and/or physical treatments which were heretofore required in order to produce colored polymers. Our method is thus of particular utility with respect to effecting the ready coloration of the high melting, crystalline, fiber forming polymers which previously required such treatments along with the use of very specific extraneous dyes in order to effect their coloration. As noted earlier, the colors inherent in our copolymers are an integral part of their respective molecules which cannot be extracted by organic solvents or detergents. Moreover, the ultra-violet stability of our copolymers, in effect, renders these colors light fast. With proper selection, our colored polymers may thus be used to form fibers and fabrics as well as in the preparation of films, sheets, and moldings which may be derived, as will be seen from any of the synthetic resins which are ordinarily prepared, either in whole or in part, from any one or more ethylenically unsaturated monomers.

Our homogeneously prepared polymeric compositions can be used in any form without encountering any of the problems which may arise when it is necessary to incorporate a solid ultra-violet stabilizer and/or a dye or pigment into a polymeric material.

There are several different techniques by which the copolymers of our invention may be utilized. Thus, where possible, they may be directly fabricated into such forms as coatings, films, sheeting and other solid shapes which may then be further fabricated into various industrial and consumer articles. On the other hand, our products may also be physically blended with a wide variety of polymers and these blends may then be used as desired. Another approach involves the application or lamination of free films of our compositions to various polymeric substrates, these films thereby serving to protect said substrates from the effects of ultra-violet radiation and also, where desired, providing for their coloration.

Illustrative of some widely used plastics which require the use of ultra-violet stabilizers are polyesters, polystyrene, polyvinyl chloride, polyethylene and polyvinylidene chloride. Polyesters, namely, the unsaturated polyesters having ethylenic unsaturation resulting from the presence of alpha, beta-unsaturated carboxylic acids such as maleic and fumaric acid, are typically formulated with monomeric styrene or methyl methacrylate and, in conjunction with fiber glass reinforcement, are employed in the preparation of corrugated and flat sheeting products. The latter are used as roofings, awnings, walk coverings, glazings for windows, skylights, etc. Another large volume outlet for polyester resins is in the construction of plastic boats. Most of these applications require outdoor exposure durability. However, unless they are stabilized, the polyester resins tend to yellow and physically deteriorate. In overcoming this poor stability on the part of the polyester resins, the practitioner need merely introduce one of the above described azobenzene monomers together with the styrene or methyl methacrylate monomer, the polymerization catalyst and the unsaturated polyester. The resulting copolymerization reaction will thus result in the homogeneous, chemically bonded incorporation of the ultra-violet absorbing moiety. Needless to say, these polyesters ay also be conveniently colored by the use of higher concentrations of our azobenzene monomers whereas they previously required the incorporation of pigments in order to effect their coloration.

Similarly, polystyrene has been recommended as a plastic for automobile reflector lights and indoor light diffusing louvers. However, polystyrene on exposure to either natural or fluorescent light tends to discolor and crack within a short period of time. By copolymerizing styrene, with one of our azobenzene derivatives, the resulting homogeneous copolymer is found to be remarkably resistant to both natural and fluorescent light and may, also, of course, be permanently colored if so desired.

Polyvinyl chloride and vinyl chloride copolymer film formulations tend to discolor and become embrittled when exposed to light for prolonged periods of time. Here again, the homogeneous copolymers prepared by copolymerizing with a small amount of one of our novel azobenzene derivatives tend to minimize the undesirable properties ordinarily displayed by these polymers. These same improvements are also obtained when polyethylene copolymers are prepared according to the process of our invention; although, ordinarily, polyethylene is very unstable to sunlight, becoming embrittled in a matter of months. It should again be noted that the vinyl chloride and ethylene copolymers of our invention may be permanently colored by the use of higher concentrations of our azobenzene monomers.

The following examples will more clearly illustrate the embodiment of our invention. In these examples, all parts given are by weight unless otherwise noted.

Below are given the names, colors and structures of the beta-hydroxypropyl acrylate and methacrylate ethers and esters of azobenzene which were used in preparing the various copolymers described in the following examples. For purposes of brevity, these monomers will hereinafter be referred to by means of the identifying letters which precede the name of each monomer.

| Identifying letter | Structure | Name | Color |
|---|---|---|---|
| A | $CH_3-\langle\rangle-N=N-\langle\rangle-O-CH_2-CH(OH)-CH_2-O-C(=O)-CH=CH_2$ | 2-hydroxy-3-(4-[4-methylphenylazo]phenoxy)propyl acrylate. | Yellow. |
| AA | $CH_3-\langle\rangle-N=N-\langle\rangle-O-CH_2-CH(OH)-CH_2-O-C(=O)-C(CH_3)=CH_2$ | 2-hydroxy-3-(4-[4-methylphenylazo]phenoxy)propyl methacrylate. | Do. |
| B | $CH_3-\langle\rangle-N=N-\langle\rangle-C(=O)-O-CH_2-CH(OH)-CH_2-O-C(=O)-CH=CH_2$ | 2-hydroxy-3-(4-[4-methylphenylazo]benzoyloxy)propyl acrylate. | Do. |
| BB | $CH_3-\langle\rangle-N=N-\langle\rangle-C(=O)-O-CH_2-CH(OH)-CH_2-O-C(=O)-C(CH_3)=CH_2$ | 2-hydroxy-3-(4-[4-methylphenylazo]benzoyloxy)propyl methacrylate. | Do. |
| C | $\langle\rangle-N=N-\langle\rangle-C(=O)-O-CH_2-CH(OH)-CH_2-O-C(=O)-CH=CH_2$ | 2-hydroxy-3-(2-phenylazobenzoyloxy)propyl acrylate. | Do. |

| Identifying Letter | Structure | Name | Color |
|---|---|---|---|
| D | ⟨phenyl-Cl⟩—N=N—⟨phenyl⟩—O—CH₂—CH(OH)—CH₂—O—C(=O)—CH=CH₂ | 2-hydroxy-3-(4-[2-chlorophenylazo]-phenoxy)propyl acrylate. | Yellow. |
| DD | ⟨phenyl-Cl⟩—N=N—⟨phenyl⟩—O—CH₂—CH(OH)—CH₂—O—C(=O)—C(CH₃)=CH₂ | 2-hydroxy-3-(4-[2-chlorophenylazo]-phenoxy)propyl methacrylate. | Do. |
| E | ⟨phenyl⟩—N=N—⟨phenyl⟩—C(=O)—O—CH₂—CH(OH)—CH₂—O—C(=O)—CH=CH₂ | 2-hydroxy-3-(4-phenylazobenzoyloxy)-propyl acrylate. | Do. |
| F | ⟨phenyl-CH₃⟩—N=N—⟨phenyl(OH)(C(=O)—O—CH₂—CH(OH)—CH₂—O—C(=O)—CH=CH₂)⟩ | 2-hydroxy-3-(5-[3-methylphenylazo]-2-hydroxybenzoyloxy)propyl acrylate. | Orange. |
| G | ⟨phenyl⟩—N=N—⟨naphthyl⟩—O—CH₂—CH(OH)—CH₂—O—C(=O)—CH=CH₂ | 2-hydroxy-3-(1-phenylazo-2-naphthyloxy)propyl acrylate. | Red. |
| H | CH₃O—C(=O)—⟨phenyl⟩—N=N—⟨phenyl⟩—O—CH₂—CH(OH)—CH₂—O—C(=O)—CH=CH₂ | 2-hydroxy-3-(4-[4-carboxymethyl-phenylazo]phenoxy)propyl acrylate. | Orange-red. |

Thus, from a study of the above given structural formulae, it may be seen that all of the ethylenically unsaturated azobenzene derivatives utilized in preparing the novel copolymers of this invention may be further characterized as corresponding to the following generic formula:

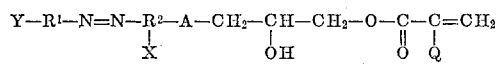

wherein $R^1$ is a phenyl radical, wherein $R^2$ is a radical of the benzene series selected from the group consisting of phenyl and naphthyl radicals, wherein Q is a radical selected from the group consisting of hydrogen and methyl radicals, wherein X and Y represent hydrogen, wherein A represents a radical selected from the group consisting of oxygen and carboxy radicals such that when A is a carboxy radical it is attached to said $R^2$ radical through the carbon atom of said carboxy radical and wherein the azo bridge and said A radical are separated from one another by $n$ carbon atoms of said $R^2$ radical wherein $n$ is a positive integer greater than 1 but not exceeding 4.

*Example I*

This example illustrates the preparation of one of the novel copolymers of our invention and also demonstrates the effects obtained by increasing the concentration of the azobenzene monomer.

An ethyl acetate lacquer of a methyl acrylate: monomer A copolymer was prepared by charging the following ingredients into a reactor equipped with a reflux condenser as well as with means for mechanical agitation.

| | Parts |
|---|---|
| Methyl acrylate | 100.0 |
| Monomer A | 0.1 |
| Ethyl acetate | 150.0 |
| Benzoyl peroxide | 0.5 |

Under agitation, the above mixture was then refluxed at 78° C. for a period of 6 hours whereupon it was cooled and discharged from the reactor. The resulting yellow lacquer had a resin solids content of 39.2%, by weight, indicating a conversion of 98.0%. The intrinsic viscosity of the copolymer, as determined in acetone at 30° C., was 0.9. Films cast from this lacquer were found to be clear and faintly yellow in color.

The above described polymerization procedure was then repeated using, respectively, 1.0, 5.0, and 10.0 parts of monomer A. Films from each of these three lacquers were again cast upon white, glazed porcelain plates. It was found that the intensity of the yellow color had increased markedly in the film derived from the copolymer containing 1.0 part of monomer A whereas the film derived from the copolymer containing 5.0 parts of the latter monomer was a deep yellow-orange in color. On the other hand, the color of the film derived from the copolymer containing 10.0 parts of monomer A was only slightly more intense than that of the film containing only 5.0 parts of the monomer. These results serve to indicate that a concentration in the range of from 5–10% of dye monomer, as based on the weight of the copolymer, is a suitable upper limit for attaining the maximum color intensity in the resulting copolymer.

The copolymer films containing 1.0, 5.0 and 10.0%, by weight, of dye monomer A, and having a dry thickness of 1.5 mils, were each immersed in separate portions of methanol. In every case, however, the methanol into which each of the films had been placed was observed to have remained colorless while the films themselves remained unchanged in their color intensity even after having been immersed for periods of as long as five days. These results indicate that the azobenzene dye monomer, as well, of course, as the color derived therefrom, was indeed an integral part of the copolymer which could not, therefore, be extracted or otherwise removed.

As a control for this test, we prepared an ethyl acetate lacquer of the homopolymer of methyl acrylate, i.e., polymethyl acrylate, using the above described polymerization procedure. To this lacquer we then added 0.1%, as based upon the weight of the polymer solids, of 4-(4-methylphenylazo)benzoic acid, the latter being a yellow dye. A film having a dry thickness of 1.5 mils, was then cast from this lacquer and this film was then immersed in a vessel containing methanol. In contrast to the above noted results obtained with the films derived from the methyl acrylate copolymers of our invention which contained the azobenzene moiety, the methanol into which this homopolymer film had been immersed was observed to have taken on a yellow color within a period of only 30 seconds. This observation thereby indicated that the post added dye had been leached from the film which had, in fact, lost the major portion of its color.

In a repetition of the above described polymerization procedure, we prepared the copolymer of methyl acrylate with varying concentration of the corresponding beta-hydroxypropyl methacrylate azobenzene comonomer, i.e. monomer AA. The results obtained in the methanol immersion tests of the films derived from these copolymers were in all cases comparable to those observed with the copolymers of monomer A.

*Example II*

The following table provides the pertinent data relating to a number of additional ethyl acetate lacquers, and the films cast therefrom, which were prepared according to the procedure described in Example I.

| No. | Composition of copolymer | Percent conversion | Color of film |
|---|---|---|---|
| 1 | 100:0.01 methyl acrylate:monomer B | 99.5 | Faint yellow. |
| 2 | 100:0.1 methyl acrylate:monomer B | 99.0 | Light yellow. |
| 3 | 100:1.0 methyl acrylate:monomer B | 99.0 | Yellow. |
| 4 | 100:3.0 methyl acrylate:monomer C | 98.9 | Yellow-orange. |
| 5 | 100:0.5 methyl acrylate:monomer D | 99.3 | Yellow. |
| 6 | 100:5.0 methyl acrylate:monomer E | 99.1 | Do. |
| 7 | 100:0.1 methyl acrylate:monomer F | 98.8 | Orange. |
| 8 | 100:1.0 methyl acrylate:monomer G | 99.0 | Red. |
| 9 | 100:2.0 methyl acrylate:monomer G | 98.8 | Do. |
| 10 | 100:0.25 methyl acrylate:monomer H | 98.1 | Orange-red. |
| 11 | 100:1.5 ethyl methacrylate:monomer A | 98.9 | Yellow. |
| 12 | 100:1.5 ethyl methacrylate:monomer AA | 98.9 | Do. |
| 13 | 100:10.0 ethyl methacrylate:monomer D | 99.4 | Yellow-orange. |
| 14 | 100:2.5 styrene:monomer G* | 97.8 | Red. |
| 15 | 100:0.01 vinyl acetate:monomer C | 96.9 | Faint yellow. |

*Prepared in toluene rather than in ethyl acetate.

The above results indicate a number of the different copolymer types which can be prepared according to the process of our invention and also demonstrates some of the colors which may be obtained.

*Example III*

This example illustrates the preparation of one of the novel copolymers of our invention by means of a pearl polymerization technique.

The following ingredients were charged into a reactor equipped with a reflux condenser, a nitrogen inlet, and means for mechanical agitation.

| | Parts |
|---|---|
| Methyl methacrylate | 100.0 |
| Monomer D | 2.0 |
| 88% hydrolyzed, medium viscosity grade polyvinyl alcohol | 0.2 |
| Benzoyl peroxide | 0.3 |
| Water | 150.0 |

Under agitation, and while passing nitrogen gas, the above mixture was heated to 70–75° C. After a short induction period of about 30 minutes, polymerization was initiated and heating was then continued for an additional 8 hours. The copolymer pearls were the washed, filtered off from the reaction mass and dried. The dry copolymer beads were yellow orange in color.

The above described pearl polymerization procedure was successfully repeated using the corresponding beta-hydroxypropyl methacrylate azobenzene monomer, i.e. monomer DD.

*Example IV*

This example illustrates the preparation of one of the novel copolymers of our invention and also demonstrates its improved resistance to the degradative effects of ultra-violet radiation.

An aqueous latex of a 90:10:0.005 vinylidene chloride:ethyl acrylate:monomer A terpolymer was prepared by charging the following ingredients into a reactor equipped with a reflux condenser as well as with means for mechanical agitation.

| | Parts |
|---|---|
| Vinylidene chloride | 90.0 |
| Ethyl acrylate | 10.0 |
| Monomer A | 0.005 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100.0 |

The above mixture was then refluxed at 33–55° C. for a period of 5 hours thereby resulting in a latex with a resin solids content of 50%, by weight, and an intrinsic viscosity, as determined in tetrahydrofuran at 30° C., of 0.8.

This latex was then used in the preparation of 1.5 mil (dry thickness) coatings which were cast upon sheets of white paper. Various samples of these coated sheets were then exposed to the following light sources:

A. At a distance of 3 feet, to four 20 watt fluorescent light bulbs which were enclosed, together with the test sheets, within a sealed box.

B. To sunlight.

The above described polymerization procedure was again utilized in preparing two comparable copolymers which were identical in their composition to the above described copolymer with the exception that they contained, respectively, 0.01 and 0.1%, by weight, of the copolymer, of monomer A. The films derived from these latices were also tested according to the above noted procedure.

As controls for these tests, similarly coated sheets were exposed under the identical conditions; however, the coatings of these control sheets were derived from a 90:10 vinylidene chloride:ethyl acrylate copolymer latex made with a recipe which was identical to that described above but which did not contain the azobenzene monomer.

The effect of the various light sources upon these resin films was determined, with respect to any color change which had occurred, by utilizing a Photovolt Reflectometer, Model #610; a device which records proportionately higher readings with the increased yellowing of the particular coatings being evaluated.

The following table presents the results of these tests. In this table, and in the table in the subsequent example, the reflectometer readings which are given represent the difference between the readings obtained from the freshly prepared coatings as against the readings obtained subsequent to their exposure to the light source.

| | | Reflectometer readings | |
|---|---|---|---|
| No. | Coating Resin | Fluorescent lamps (120 hrs. exposure) | Sunlight (12 hrs. exposure) |
| 1 | 90:10:0.005 vinylidene chloride: ethyl acrylate:monomer A. | 6 | 10 |
| 2 | 90:10:0.01 vinylidene chloride: ethyl acrylate:monomer A. | 8 | 12 |
| 3 | 90:10:0.1 vinylidene chloride: ethyl acrylate:monomer A. | 5 | 11 |
| Control | 90:10 vinylidene chloride:ethyl acrylate. | 16 | 23 |

The above data indicates that the novel copolymers of our invention are far superior in their resistance to the effects of ultra-violet radiation as compared with comparable polymers which do not contain the ultra-violet absorbing azobenzene moiety. Moreover, it will be noted that the results obtained with coating resin #2 were better than those obtained with the control, although the improvement was somewhat less than that noted with coating resin #1. On the other hand, coating resin #3 gave results which were comparable to coating resin #1; however, because of the higher concentration of monomer A in resin #3, the resulting coating was found to have a slight yellow coloration.

*Example VI*

This example illustrates the preparation of one of our novel copolymers which, in this case, was a vinyl chloride:butyl acrylate copolymer latex. The improved resistance of this copolymer to the degradative effects of ultra-violet radiation is also demonstrated.

An aqueous latex of a 60:40:0.01 vinyl chloride:butyl acrylate:monomer B terpolymer was prepared by charging the following ingredients into a pressurized reactor.

| | Parts |
|---|---|
| Vinyl chloride | 60.0 |
| Butyl acrylate | 40.0 |
| Monomer B | 0.01 |
| Octyl phenoxy polyoxyethylene ethanol | 7.5 |
| Sodium lauryl sulfate | 2.0 |
| Ammonium persulfate | 0.4 |
| Water | 168.0 |

The above mixture was then maintained at a temperature of 70° C. for a period of 8 hours resulting in a latex with a resin solids content of 39.3%, by weight, and which had an intrinsic viscosity, as determined in tetrahydrofuran at 30° C. of 0.5.

This latex was then used in the preparation of 1.5 mil (dry thickness) coatings which were cast upon sheets of white paper. Samples of these coated sheets were then exposed to sunlight for a period of 30 days.

The controls for this test comprised sheets which had been coated with a 60:40 vinyl chloride:butyl acrylate copolymer latex which had been prepared by means of the above described polymerization procedure but which did not contain the azobenzene moiety. The following table presents the results of these tests.

| No. | Coating resin | Reflectometer readings— Sunlight (30 days exposure) |
|---|---|---|
| 1 | 60:40:0.01 vinyl chloride:butyl acrylate: monomer B. | 7 |
| Control | 60:40 vinyl chloride:butyl acrylate | 15 |

The above results again clearly indicate the superior light stability of our polymers as compared with comparable polymers which do not contain an ultra-violet stabilizing moiety.

The above described polymerization procedure was successfully repeated using the corresponding beta-hydroxypropyl methacrylate azobenzene monomer, i.e. monomer BB. The coatings derived from the resulting copolymer again demonstrated superior light stability in comparison with coatings derived from the above described control.

Summarizing, our invention is thus seen to provide a novel class of polymers which are characterized by their built-in color as well as by their resistance to the normally degradative effects of ultra-violet radiation. Variations may be made in proportions, procedures and materials without departing from the scope of this invention as defined by the following claim.

We claim:

A copolymer of an ethylenically unsaturated monomer and an ethylenically unsaturated azobenzene derivative corresponding to the formula:

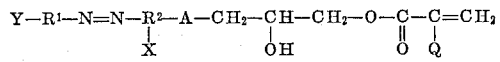

wherein $R^1$ is a phenyl radical, wherein $R^2$ is a radical of the benzene series selected from the group consisting of phenyl and naphthyl radicals, wherein Q is a radical selected from the group consisting of hydrogen and methyl radicals, wherein X and Y represent hydrogen, wherein A represents a radical selected from the group consisting of oxygen and carboxy radicals such that when A is a carboxy radical it is attached to said $R^2$ radical through the carbon atom of said carboxy radical and wherein the azo bridge and said A radical are separated from one another by $n$ carbon atoms of said $R^2$ radical wherein $n$ is a positive integer greater than 1 but not exceeding 4.

References Cited by the Examiner

Wiley et al.: J.A.C.S., vol. 70 (1948), pp. 2295–6.

JOSEPH L. SCHOFER, *Primary Examiner.*

J. R. LIEBERMAN, *Examiner.*